March 24, 1959 E. J. KIKTA 2,879,492

DETACHABLE SUPPORT FOR ELECTRICAL COMPONENTS

Filed Oct. 4, 1954

2 Sheets-Sheet 1

INVENTOR
EDWARD J. KIKTA

BY Carl Beust
Wilfred G. Caldwell

HIS ATTORNEYS

March 24, 1959 — E. J. KIKTA — 2,879,492
DETACHABLE SUPPORT FOR ELECTRICAL COMPONENTS
Filed Oct. 4, 1954 — 2 Sheets-Sheet 2
FIG. 7
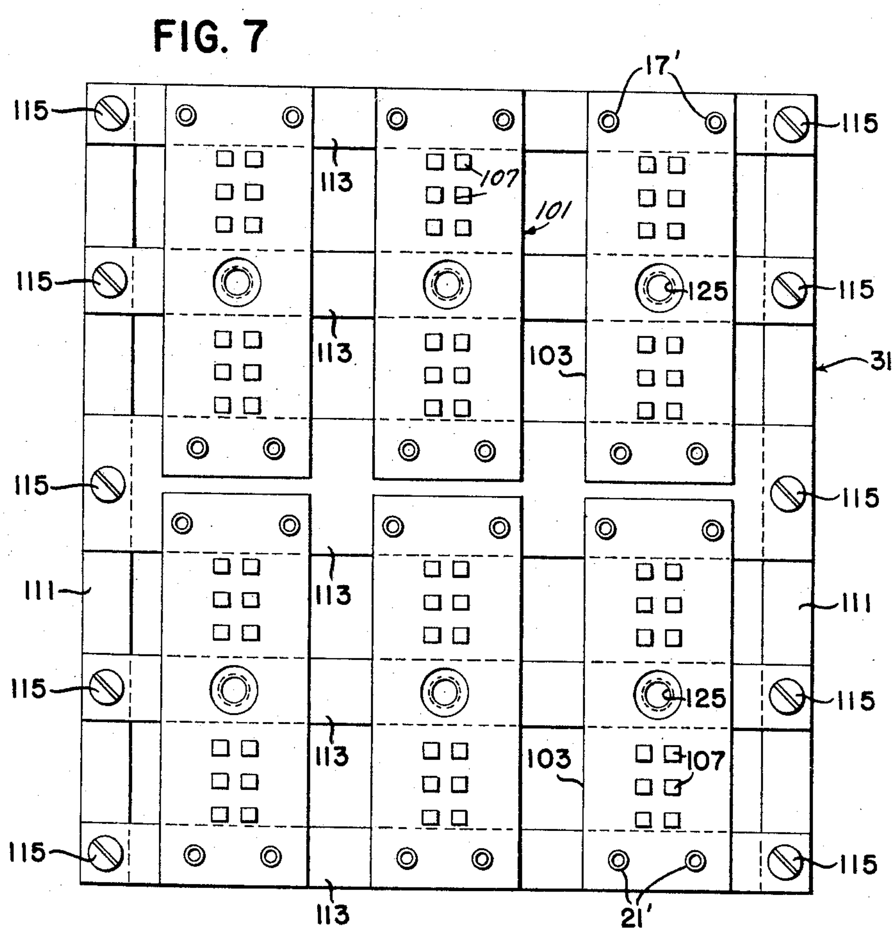
FIG. 4
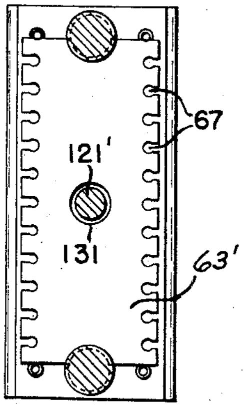
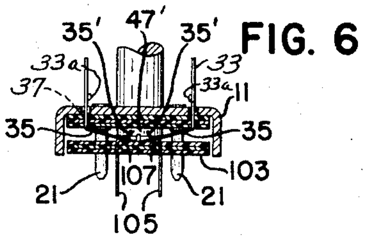
INVENTOR
EDWARD J. KIKTA
BY Carl Berst
Wilfred G. Caldwell
HIS ATTORNEYS United States Patent Office 2,879,492

Patented Mar. 24, 1959

2,879,492

DETACHABLE SUPPORT FOR ELECTRICAL COMPONENTS

Edward J. Kikta, Youngstown, Ohio, assignor to The National Cash Register Company, Dayton, Ohio, a corporation of Maryland Application October 4, 1954, Serial No. 459,950

4 Claims. (Cl. 339—17)

The present invention relates to a readily attachable and detachable unit for supporting electrical circuit components and establishing electrical connections between the components carried thereby and fixed terminals of a receiving or terminal board adapted to receive the unit. More particularly, the unit is capable of supporting electron tubes and associated components such as resistors and capacitors utilized in the immediate tube circuitry.

Terminal or unit-receiving boards are common in laboratory test set-ups, the boards usually having connected thereto power supplies, different types of voltage sources, and electrical circuits of a more permanent nature than the experimental or test set-ups. Also, it is customary practice in the development of complicated electronic devices to build sections of the apparatus on detachable units, which not only facilitates modifications but also permits replacements of entire sections for testing or use of alternate sections.

In order to insure accurate testing, the detachable unit must be capable of establishing absolutely reliable connections between the fixed terminals and the circuits and components which it supports, and also the unit should admit of easy installation and removal.

The novel unit of the invention includes a base plate having offset locating pins to fit correspondingly offset receiving apertures in the receiving board to insure that the unit will be properly located relatively to the receiving board. A plurality of lugs extends through the base plate to form on one side thereof anchors to which the electrical components are soldered or otherwise connected and to form on the other side spring contacts for making wiping contact with the terminals of the receiving board. A socket-supporting plate, having openings to accommodate electronic tube sockets, is also included in the unit and is spaced from the base plate and supported therefrom by spacer posts, the spacing between the plates being provided to accommodate the electrical components which it is desired to connect between the tube sockets and the base plate lugs. A plurality of flexible shelves is supported in mutually-spaced-apart relation between the base plate and the socket-supporting plate by the spacer posts. The shelves are provided with peripheral slots to accommodate the lead wires of the electrical components, which in turn anchor or fix the shelves in the spaced-apart positions. Locking means is associated with the base plate for locking the unit in place and for moving it in the direction of the receiving board to force the spring contacts into wiping engagement with the terminals of the board against the resiliency of the contacts. This construction readily admits of sectionalizing, so that units for accommodating large and small circuits may be fabricated from similar parts.

With the foregoing in mind, among the objects of the present invention are the provision of a readily attachable and detachable unit for supporting electrical components and establishing reliable electrical connection of the components with terminals of a receiving board, the provision of such a unit wherein the contact-making is established through wiping engagement of spring contacts and incorporating locking means for maintaining the spring contacts in operative engagement, the provision of a detachable unit incorporating flexible shelves susceptible of displacement for accommodating different sized electrical components and in turn being fixed in position by the components as they are connected in the unit, and the provision of a unit admitting of simple fabrication and assembly and capable of being inexpensively mass-produced.

The foregoing description will be amplified and the invention further described in the detailed description of a preferred embodiment thereof, which is illustrated in the accompanying drawings.

Of the drawings:

Fig. 4 is a cross-sectional view of Fig. 3, taken along the plane marked by the arrows 4—4 to show a shelf in plan view.

Fig. 6 is a detailed view of a portion of the unit of Fig. 1 in operative relation with the portion of the receiving board shown in Fig. 7, and Fig. 7 is a view, in elevation, of a typical receiving board adapted to receive either of the types of units of Figs. 1 and 3.

Figs. 1 and 3 show, respectively, a two-section and a single-section unit. Since the construction is very similar, the description will be cross-referenced between the units, as the figures collectively show all of the structure of a typical unit.

Figures 1, 2, 3, 5:
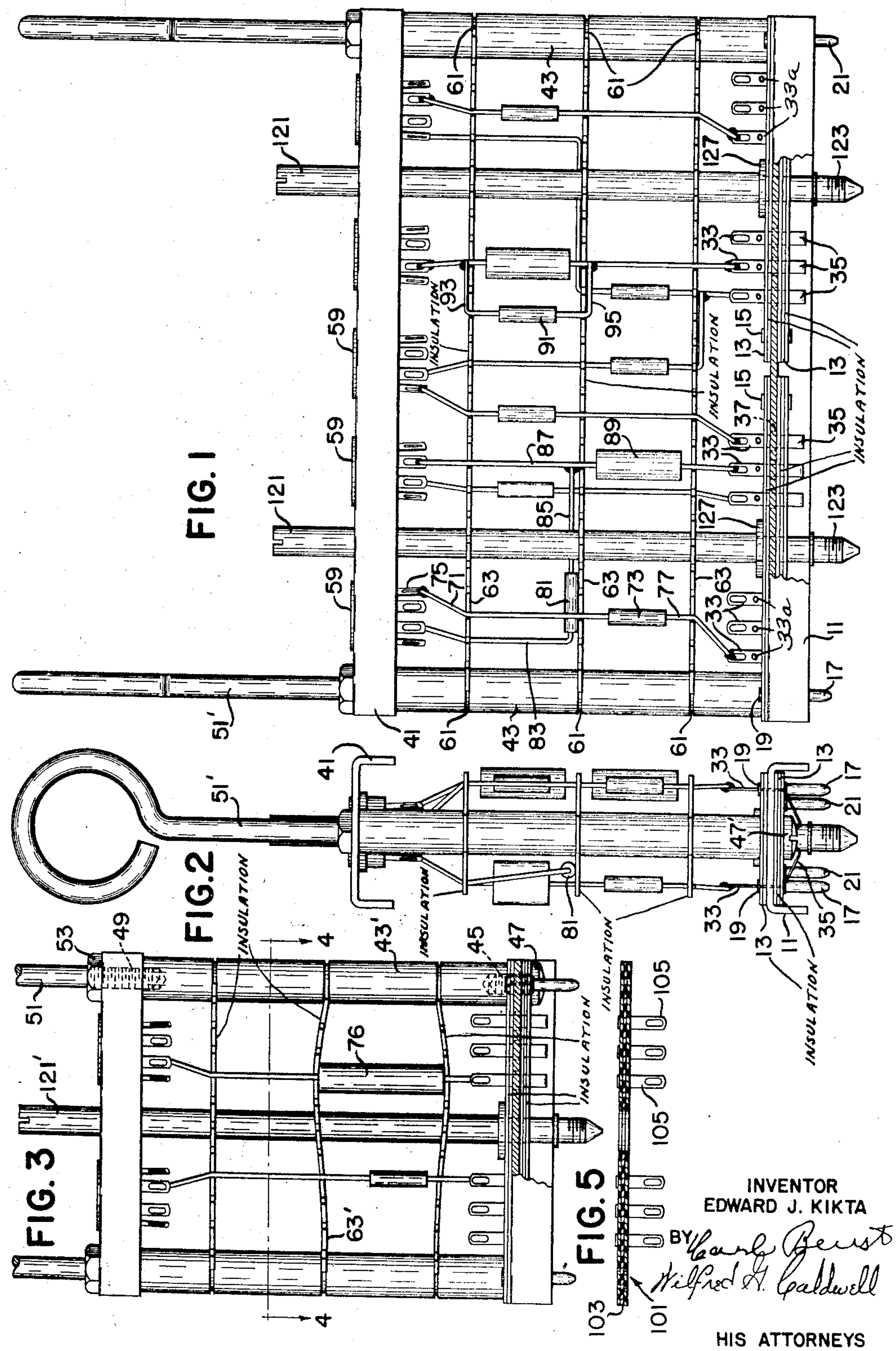
Fig. 1 is a view, in side elevation, of a two-section unit showing certain electrical components supported thereby. The external structure is partly broken away to reveal the internal construction.
Fig. 2 is a view, in end elevation, of the unit of Fig. 1.
Fig. 3 is a view, in side elevation, of a single section unit, partly broken away to show its internal construction.
Fig. 5 is a cross-sectional view of a portion of the receiving board adapted to receive the unit of Fig. 3.

In Figs. 1 and 2 there is illustrated a base plate 11 of channel section, which provides a foundation for the unit. Strips or layers 13 of insulating material, such as synthetic resins or "Formica," are secured to the inner and outer faces of the channel web by hollow rivets 15 (Fig. 1). A pair of pins 17, also having rivet heads 19, penetrates the channel web and layers of insulation 13 and assists in securing the latter to the former. Similarly, and at the opposite end of the channel web, a pair of pins 21, spaced closer together than the pins 17, also depend from the channel. The spacing of the pins 17 and 21 corresponds to the spacing of the apertures in the hollow rivets 17' and 21' of the receiving board 31, shown in Fig. 7. This offset arrangement insures that the unit is properly oriented with respect to the receiving board each time a connection is established.

A plurality of lugs penetrates the base plate 11 to form spaced-apart anchors or connectors 33 along the outside of the channel web and spring contacts 35 contained within the channel. The lugs pass through oversized apertures 37 in the channel web, so that they are electrically isolated from the base plate 11. The anchors or connectors 33 are dented as shown at 33a just above the upper layer 13 of insulation, and the lower extremities forming the spring contacts 35 are bent transversely of the channel so as to position the lugs, the layers 13 of insulation providing the lateral support.

A face plate 41, or socket-supporting plate is supported from the base plate 11, and in spaced-apart relation therewith, by a pair of spacer posts 43. This construction is best illustrated in the single-section unit of Fig. 3, wherein the lower end of the posts 43' are drilled and tapped with threads 45 to accommodate a screw 47 for securing the spacer post to the base plate. The upper ends of the posts are also drilled and tapped with threads 49 for receiving a threaded end of a handle 51 having located thereon a nut 53, which acts as a stop when the handle is screwed tightly into the post because the nut cannot pass beyond the threaded portion of the handle 51. The face plate 41 is provided with a plurality of openings (not shown) for accommodating electron tube sockets 59 (Fig. 1) riveted or otherwise secured to the face plate.

The posts 43 (Fig. 1) are milled or turned down at spaced-apart positions providing the grooves 61, which accommodate flexible shelves 63 of, for example, the same material as the insulating layers 13. A shelf 63' of the unit of Fig. 3 is shown in plan in Fig. 4, wherein peripheral slots 67 are plainly visible. These slots accommodate the lead-in wires, such as wire 71 of resistor 73 (Fig. 1), extending from the resistor to the lugs 75 of the sockets 59. The other lead-in wire 77 of resistor 73 is shown connected to one of the lugs 33 supported by the base plate 11. The components depicted in Fig. 1 are haphazardly arranged, as is common practice in the wiring of circuits where additions and alterations are made. For example, a resistor 81 is depicted lying on the intermediate shelf 63 (Figs. 1 and 2) with its lead wire 83 extending to the left-hand tube socket 59 and its lead wire 85 connecting to a lead wire 87 of resistor 89, forming a portion of an electrical circuit supported on the unit. A further resistor 91, located between the upper and intermediate shelves of the pluggable unit of Fig. 1, has its lead wires 93 and 95 lying on opposite faces of two of the shelves 63, thereby lending rigidity to the structure. Of course, such components as the resistor 73, connected between the lugs 33 and 75, also lend rigidity to the structure by fixing the flexible shelves in position.

Since all components are not of uniform size (as, for example, note the large resistor 76, shown in Fig. 3), the flexibility of the shelves 63' permits spacing of the shelves to accommodate the largest component, the shelves retaining the bowed positions illustrated in Fig. 3 due to the components.

Figs. 5 and 7 show the receiving or terminal board construction. The structure of Fig. 5 is a single unit adapted for receiving the support of Fig. 3, whereas the multi-unit structure of Fig. 7 is adapted to receive the units of either Figs. 1 or 3. In Fig. 5, a receiving blank 101 is fabricated of insulating layers 103 glue together to provide a suitable thickness for supporting the terminal lugs 105. These lugs extend through the blank and are bent over to form the terminal contacts 107, visible in Fig. 7. The receiving board 31 comprises longitudinal frame members 111 and transverse members 113 secured thereto by the screws 115. The receiving blanks 103 are apertured at both ends to accommodate the hollow rivets 17' and 21', which receive the unit locating pins 17 and 21 and also serve to secure the receiving blanks to the transverse frame members 113.

In Fig. 6 there is shown a sectional view of the right-hand end of the unit of Fig. 1 in connection with a blank 103 of the receiving board 31, the base plate channel 11 spanning the receiving blank 103 with the pins 21 of the former penetrating the hollow rivets 21' of the latter. The spring contacts 35 of the base plate lugs are depressed against the terminals 107 of the receiving blank 103 by turning the locking rods 121 (Fig. 1) to cause their threaded male ends 123 to engage in holes 125 (Fig. 7) tapped into the transverse frame members 113. This causes collars 127, fixed on the shafts or rods 121, to bear against the upper face of the base plate 11 and urge the plate in the direction of the receiving board, but the flanges of the base channel 11 abut the transverse frame members 113 to prevent the spring contacts 35 from being depressed flush with the inner surface of the base plate 11, so that their resiliency is not impaired. The spring contacts 35 are also provided with in-turned extremities 35', which augment the resilient action of the spring contacts when the unit is severely tightened against the receiving board.

The shafts 121 pass through oversized apertures in the face plate 41 and the shelves 63, so that the shaft does not affect these components. Such an aperture 131 is shown in the shelf 63' of Fig. 4 accommodating the shaft 121'.

From the foregoing it should be apparent that the detachable unit of the instant invention is an electrical connector apparatus of particular importance in the development of extensive electronic circuitry. The sectionalizing feature permits integral circuits of different sizes to be self-contained and integrated as components into a computer or the like at will, the offset or locating pins serving to insure proper orientation of the units with the receiving board each time a connection is established. The displaceable shelves also aid in the unitizing of the structure by permitting the assembly of components of different sizes in each unit. The wiping feature of the contact-making insures reliable electrical connection of all parts, and, of course, the more frequently the units are attached and detached, the greater the contact-cleaning action becomes. With these many features, the detachable unit forms an exceptionally useful device in the fabrication and maintenance of complex apparatus.

While the form of apparatus shown and described herein is admirably adapted to fulfill the objects primarily stated, it is to be understood that it is not intended to confine the invention to the one form or embodiment disclosed herein, for it is suspectible of embodiment in various other forms.

What is claimed is:

1. A detachable unit for supporting electrical circuit components and establishing electrical connection thereof to fixed terminals of a receiving board adapted to receive the unit, comprising a base plate having pins to fit receiving apertures in the board, a plurality of lugs penetrating the base plate to form spaced-apart anchors along the face of the base plate adapted to be disposed away from the board for lead wires of the electrical components, said lugs having their extremities bent over along the face of the base plate adapted to oppose the board to form spring contacts for engagement with said terminals, a socket-supporting plate having openings to accommodate electron tube sockets, spacer posts between the base plate and the socket-supporting plate for locating the latter in fixed spaced relation with the former, a plurality of insulating shelves supported by the spacer posts in spaced relation between the base plate and the socket-supporting plate, said shelves having peripheral slots to accommodate the lead wires of the electrical components adapted to be connected between said lugs and said tube sockets, and locking means for moving the base plate toward the board against the resiliency of the spring contacts to establish electrical connection between the contacts and the terminals of the board.

2. A detachable unit for supporting electrical components and establishing electrical connections between the components and fixed terminals of a receiving board adapted to receive the unit, comprising a base channel having locating pins to fit receiving apertures in the receiving board, a plurality of lugs penetrating the base channel in mutually-spaced-apart relation, each of said lugs having a connector portion extending beyond the outside of the channel web and a spring contact portion within the channel and extending transversely thereof, insulating means electrically isolating the lugs from the base channel, engaging means also penetrating the base channel and adapted to engage the receiving board for urging the channel toward the board against the resiliency of the spring contacts to establish electrical connection between the lugs and the terminals of the board, a face plate having openings to accommodate electron tube sockets, spacer posts for securing the face plate in fixed spaced-apart relation to the base channel, and a plurality of flexible shelves extending between the spacer posts and supported thereby in mutually-spaced-apart relation, said shelves having a plurality of peripheral slots for accommodating the lead wires of electrical components connected between the tube sockets and said lugs.

3. A detachable unit for supporting electrical circuit components and establishing electrical connection thereof to fixed terminals of a receiving board adapted to receive the unit, comprising a base plate having offset pins to fit correspondingly-positioned receiving apertures in the receiving board, a plurality of lugs penetrating the base plate to form spaced-apart anchors along one face of the base plate for lead wires of the electrical components, said lugs having their extremities bent over along the other face of the base plate and spaced therefrom to form spring contacts for engagement with said terminals, a socket-supporting plate having openings to accommodate electron tube sockets, spacer posts between the base plate and the socket-supporting plate for locating the latter in fixed spaced relation with the former, a plurality of insulating shelves supported by the spacer posts in spaced relation between the base plate and the socket-supporting plate, said shelves having peripheral slots adapted to accommodate the lead wires of the electrical components adapted to be connected between said lugs and said tube sockets, locking means for moving the base plate toward the receiving board against the resiliency of the spring contacts to establish electrical connection between the contacts and the terminals of the receiving board, and stops on the base plate to control the extent to which the spring contacts are depressed when the unit is in engagement with the receiving board.

4. A detachable unit for establishing electrical connections between electrical components supported thereby and terminals of a receiving board, comprising a base plate having locating pins extending from a face thereof to fit receiving apertures in the receiving board, a plurality of lugs penetrating the base plate and projecting out of the face opposed to said first-mentioned face in spaced-apart positions therealong to provide anchors for lead wires of the electrical components, said lugs being bent over along the first-mentioned face of the base plate and spaced therefrom to provide resilient electrical contact means in cooperation with complementary terminals of the receiving board, insulating means for electrically isolating the lugs from the base plate, means supported from the base plate for supporting electron tube sockets and electrical components adapted to be connected between the tube sockets and said anchors, means for depressing the spring contacts of the base plate against the terminals of the receiving board to insure electrical connections between the lugs and the terminals, and turned-in extremities on the ends of the bent-over portions of the lugs to augment the resilient action of the spring contacts of the base member during the engagement of said contacts with the terminals of the receiving board.

References Cited in the file of this patent

UNITED STATES PATENTS

| | | |
|---|---|---|
| 1,414,874 | Graf | May 2, 1922 |
| 2,052,272 | Auth | Aug. 25, 1936 |
| 2,209,213 | Vernon | July 23, 1940 |
| 2,436,914 | Breisch | Mar. 2, 1948 |
| 2,483,551 | Libman | Oct. 4, 1949 |
| 2,579,141 | Eckert et al. | Dec. 18, 1951 |
| 2,628,263 | Bulla | Feb. 10, 1953 |
| 2,628,270 | Himmel | Feb. 10, 1953 |
| 2,647,244 | Dewey et al. | July 28, 1953 |
| 2,691,147 | Sutton et al. | Oct. 5, 1954 |
| 2,754,453 | Noell | July 10, 1956 |
| 2,754,454 | McNutt | July 10, 1956 |